Patented June 22, 1926.

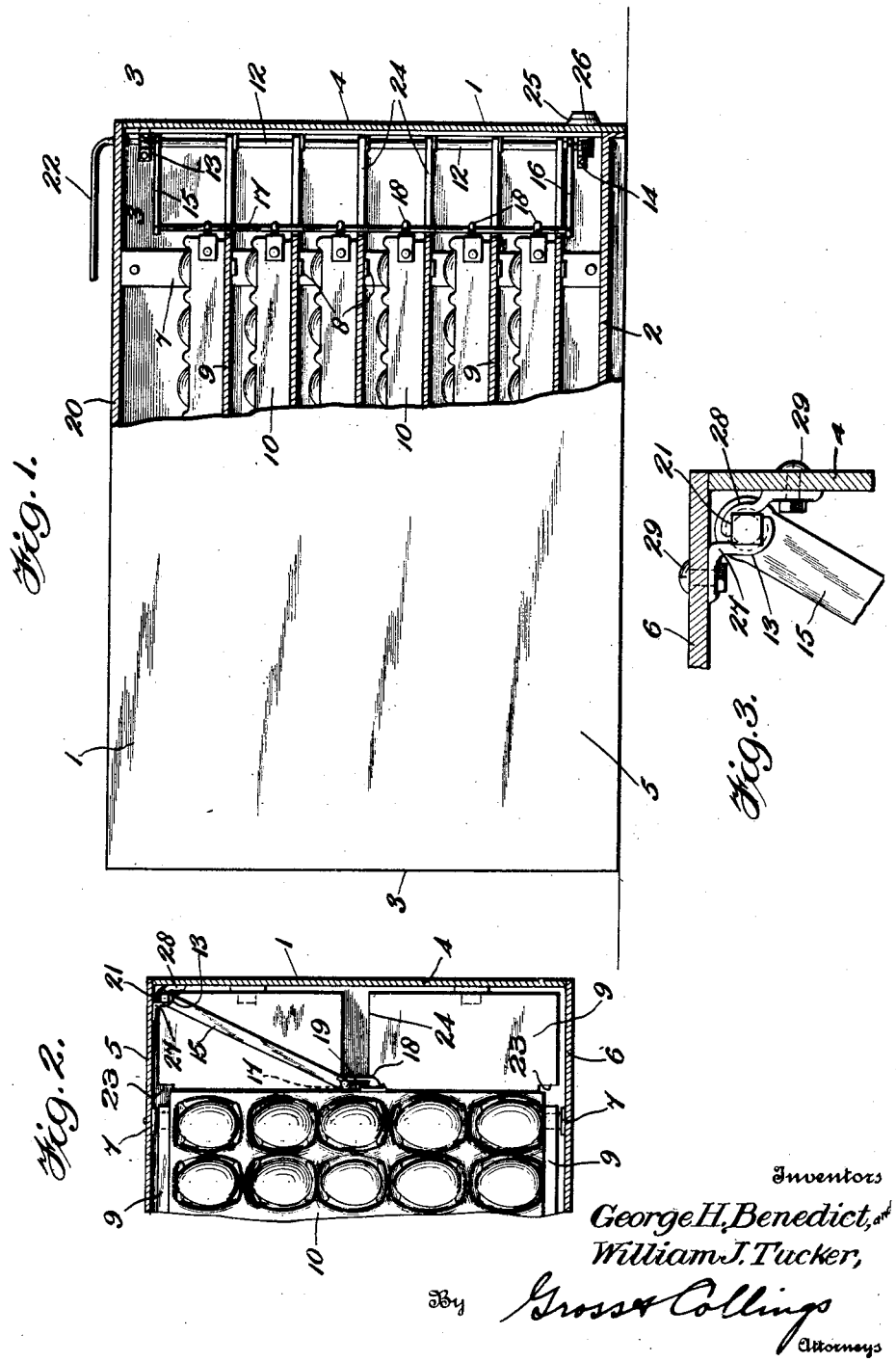

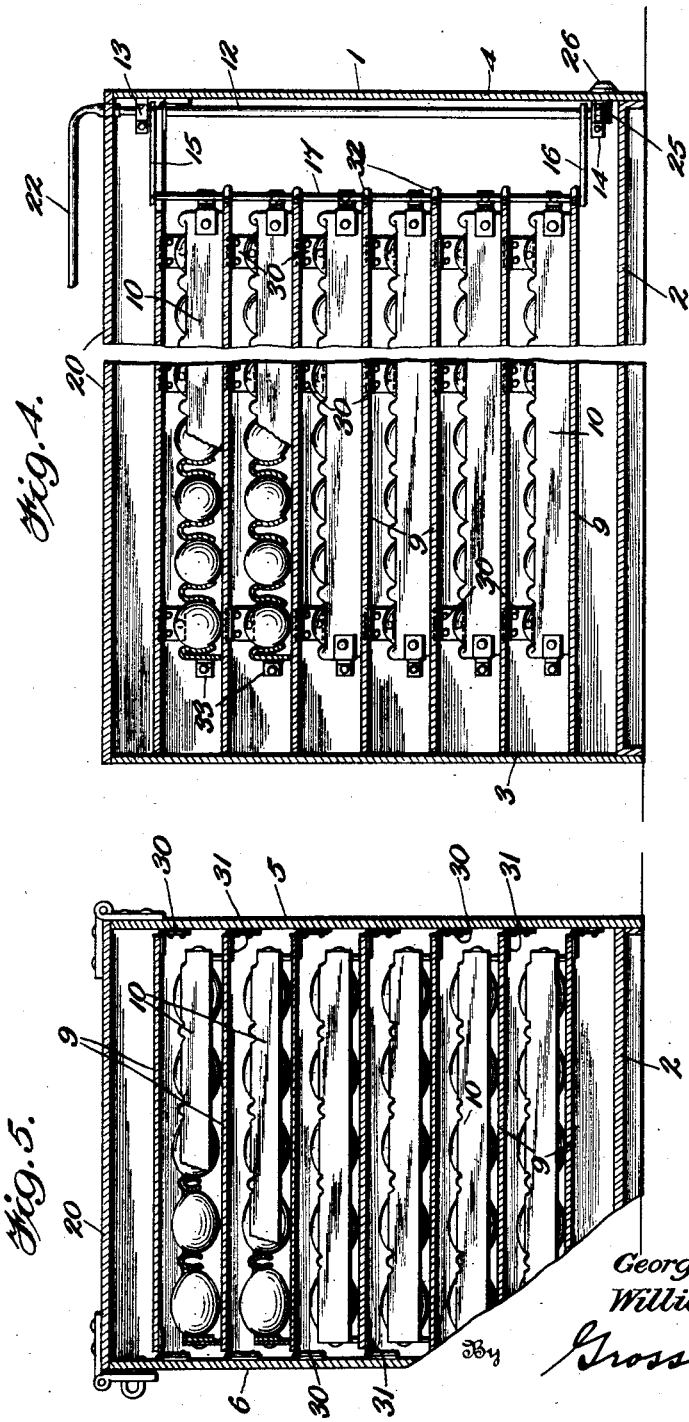

1,589,457

UNITED STATES PATENT OFFICE.

GEORGE H. BENEDICT AND WILLIAM J. TUCKER, OF WASHINGTON, DISTRICT OF COLUMBIA, ASSIGNORS, BY MESNE ASSIGNMENTS, TO AMERICAN WAREHOUSE CORP., OF WASHINGTON, DISTRICT OF COLUMBIA, A CORPORATION OF DELAWARE.

APPARATUS FOR PRESERVING EGGS.

Application filed February 14, 1922, Serial No. 536,469. Renewed November 16, 1925.

This invention relates to apparatus for preserving eggs and other similar food products and has for its object to provide an apparatus of this character which will be simple in construction, and comparatively inexpensive to manufacture.

With the above and other objects in view the invention consists in the novel details of construction and combinations of parts more fully hereinafter disclosed and particularly pointed out in the claims.

Referring to the accompanying drawings forming a part of this specification in which like numerals designate like parts in all the views:

Figure 1 is a diagrammatic side elevational view partly in section of an apparatus made in accordance with the present invention;

Fig. 2 is a fragmentary part sectional part plan view of the parts shown in Fig. 1;

Fig. 3 is an enlarged detail sectional view;

Fig 4 is a longitudinal vertical sectional view of a somewhat modified form of the apparatus; and Fig. 5 is a transverse vertical sectional view, partly broken away, of the form of apparatus shown in Fig. 4.

Referring more especially to Figs. 1, 2 and 3, 1 indicates a container or receptacle preferably of sheet metal construction provided with the bottom 2, the end walls 3 and 4, and the side walls 5 and 6. Removably supported within the said container 1, as by the members 7 provided with the supporting lugs 8, are a plurality of plates or shelves 9 upon which are adapted to rest the egg-supporting frames or trays 10. The supporting members 7 may be of any suitable construction but in this form of the apparatus they are illustrated as comprising vertical sheet metal members stamped to provide the angularly disposed supporting lugs 8 and secured to the side and end walls of the said receptacle 1, all as is fully disclosed and claimed in the co-pending application of George H. Benedict, filed February 14, 1922 Ser. No. 536,493, and entitled Egg preserving apparatus. In like manner the egg-supporting trays 10 may be of any suitable construction but they are here illustrated as being constructed in the same manner as that disclosed in the co-pending application of George H. Benedict, filed February 14, 1922, Serial No. 536,492, and entitled Apparatus for preserving eggs.

In the form of the apparatus shown in Figs. 1 and 2, the supporting shelves 9 are of substantially the same dimensions as the interior of the receptacle 1, whereby longitudinal and lateral movement thereof is prevented and the frames 10 are adapted to be moved relatively thereto by means which will now be disclosed.

The said frame-moving means comprises a rod or shaft 12 journaled in suitable bearings 13 and 14 at or near one corner of the receptacle 1, as will be clear from the drawings. The said shaft has rigidly secured to it adjacent its upper and lower ends the horizontally disposed arms 15 and 16, the ends of which are suitably connected together by means of a rigid vertically extending rod or bar 17.

Each of the egg-holding trays 10 is provided upon one end with a rigid hook or finger member 18 providing a space or slot 19 between the said tray and the said finger into which the said rod 17 is adapted to be placed.

The extreme upper end of the operating rod 12 may be squared as at 21 and may project through an opening in the hinged top member 20 of the container 1, whereby it may be engaged by a suitable socket wrench or crank 22 adapted to rotate the same. One edge of the supporting plates or shelves 9 may be provided with notches 23 whereby said plates may be readily introduced within the container, all as was disclosed in the said co-pending application of George H. Benedict, Ser. No 536,493 and the said plates may be further provided with the slots or channels 24 to permit the movement therein of the vertical rod or bar 17. The container may also be provided near its bottom with a suitable outlet 25 normally closed by a plug member 26.

The bearing members 13 and 14 may be of any desired construction but it is preferred to make them in two sections 27 and 28 which may be readily and cheaply stamped from sheet material. The said sections may each be secured to the walls 6 and 4, respectively, of the container 1 by means of a single bolt or rivet 29, thereby permitting the ready removal of the shaft 12 by merely loosening one of the said bolts 29 and removing the section 27.

The operation of this form of the device will be clear from the foregoing but it may be briefly summarized as follows: The outlet passage 25 of the container 1 being closed, the plates 9 may be introduced therein in the manner disclosed in the said copending application Ser. No. 536,493, and the egg-supporting trays 10 placed thereon with their hook members 18 engaging the vertical rod 17 of the operating means. As many of the plates and trays as is necessary or desired may be thus introduced into the container up to its capacity and the said container is then filled to a level somewhat above the uppermost tray with a suitable preserving fluid such for example as a solution of sodium silicate.

When it is desired to rotate the eggs for the purpose of preserving their yokes in the central portion of their shells, as disclosed in the said patent to Nichols, No. 1,302,955, the wrench 22 may be applied to the squared end 21 of the shaft 12 and the said shaft rotated thereby in a counterclockwise direction, as seen in Fig. 2, thereby oscillating or moving the arms 15 and 16 through the arc of a circle and by means of the vertical rod 17, pulling the trays 10 to the right, as seen in Fig. 1. The eggs may be permitted to remain in this position for any desired length of time and when it is again desired to rotate them the said rod 12 may be moved in the opposite direction by means of the wrench 22, whereupon the trays and their contained eggs will be returned to the position illustrated in Fig. 1.

The resistance offered by the movement of the trays 10 through the preserving liquid is relatively great and in large apparatus it is a serious factor. In order to overcome this we have shown in Figs. 4 and 5 a form of the apparatus in which the trays 10 are held stationary within the receptacle 1 while the shelves or plates 9 which support the said trays may be moved relatively thereto. In this modified form the method of supporting the shelves or plates shown in Figs. 1 and 2 cannot be used and we have therefore provided upon the side walls 5 and 6 of the container 1 a plurality of sets of hinges 30 which are so constructed that when their leaves 31 reach a position at right angles to the plane of the vertical side walls 5 and 6 they will rotate no further but will form adequate horizontal supporting members for the plates 9. The said plates 9 are provided with suitable hook members 32 which are adapted to engage the vertical operating rod 17 in a manner similar to the finger members 18 in the form shown in Figs. 1 and 2, whereby the said plates 9 may be slid upon their supports 31 relative to the trays 10 and their contained eggs. It will be readily apparent that the desired result of rotating the eggs will thus be accomplished in just as efficient a manner as when the trays themselves are slid and without encountering the objection due to the resistance offered by the movement of the said trays through the preserving fluid. Any suitable form of means such as the stop brackets 33 may be provided for preventing longitudinal movement of the trays 10.

It is obvious that those skilled in the art may vary the details of construction as well as the arrangements of parts without departing from the spirit of the invention, and therefore it is not wished to be limited to the above disclosure except as may be required by the claims.

What we claim is:

1. In an apparatus of the class described the combination with a receptacle of a plurality of plate members removably mounted within said receptacle; a plurality of supporting tray members mounted upon said plate members; an oscillating shaft journaled within said receptacle; a pair of spaced lever arms rigid with said shaft; a rod rigidly connecting the ends of said lever arms; and means carried by one set of said members adapted to engage said rod, whereby said set of members may be moved by said rod relative to the other set.

2. In an apparatus of the class described the combination with a receptacle of a plurality of plate members removably mounted within said receptacle; a plurality of supporting tray members mounted upon said plate members; an oscillating shaft journaled within said receptacle; a pair of spaced lever arms rigid with said shaft; a rod rigidly connecting the ends of said lever arms; and means comprising hooked finger members carried by one set of said members adapted to slidably engage said rod, whereby said set of members may be moved by said rod relative to the other set.

3. In an apparatus of the class described the combination of a receptacle provided with side and end walls; hinged supporting members carried by said walls; a plurality of plates provided with hook members movably mounted on said hinged members;

a plurality of trays mounted on said plates, means for preventitng longitudinal movement of said trays; a shaft journaled within said receptacle; a pair of spaced lever arms rigid with said shaft; a vertical rod rigidly connecting the ends of said lever arms, adapted to engage said hook members whereby said plates may be moved relative to said trays; and means for oscillating said shaft.

In testimony whereof we affix our signatures.

GEORGE H. BENEDICT.
WILLIAM J. TUCKER.